(12) United States Patent
Bechhold

(10) Patent No.: US 6,493,984 B1
(45) Date of Patent: Dec. 17, 2002

(54) FISHING LURE AND TROLLING FLASHER

(76) Inventor: Jerry Bechhold, P.O. Box 2672, Petaluma, CA (US) 94975

( * ) Notice: Subject to any disclaimer, the term of this patent is extended or adjusted under 35 U.S.C. 154(b) by 0 days.

(21) Appl. No.: 09/963,897

(22) Filed: Sep. 25, 2001

Related U.S. Application Data
(60) Provisional application No. 60/236,242, filed on Sep. 28, 2000.

(51) Int. Cl.$^7$ ............................................. A01K 85/10
(52) U.S. Cl. ..................... 43/43.13; 43/42.46; 43/42.51
(58) Field of Search ....................... 43/42.46, 42.51, 43/43.13

(56) References Cited

U.S. PATENT DOCUMENTS

| | | | | |
|---|---|---|---|---|
| 2,573,215 A | * | 10/1951 | Murphy | 43/42.46 |
| 2,769,269 A | * | 11/1956 | Martin et al. | 43/42.46 |
| 3,056,228 A | * | 10/1962 | Stackhouse | 43/42.51 |
| 3,656,253 A | * | 4/1972 | Gaunt | 43/42.33 |
| 3,789,536 A | * | 2/1974 | Parmeson | 43/42.05 |
| 3,858,344 A | * | 1/1975 | Watts | 43/42.05 |
| 4,201,006 A | * | 5/1980 | Wetherald | 43/42.06 |
| 4,486,970 A | * | 12/1984 | Larson | 43/43.13 |
| 4,501,086 A | * | 2/1985 | Bunce | 43/42.2 |
| 4,803,798 A | * | 2/1989 | Hannah | 43/43.13 |
| 4,936,042 A | * | 6/1990 | Causey | 43/42.16 |
| 5,003,723 A | * | 4/1991 | Dutcher et al. | 43/42.13 |
| 5,185,951 A | * | 2/1993 | Hemmerle | 43/43.13 |
| 5,970,648 A | * | 10/1999 | DeRose | 43/42.33 |
| 6,032,401 A | * | 3/2000 | King | 43/42.51 |

* cited by examiner

*Primary Examiner*—Charles T. Jordan
*Assistant Examiner*—Bret Hayes
(74) *Attorney, Agent, or Firm*—Larry D. Johnson; Craig M. Stainbrook; Johnson & Stainbrook,LLP

(57) ABSTRACT

A fishing lure and trolling flasher having front and back ends, top and bottom sides, and a beveled edge bordering the entire lure that tapers downwardly from the top to the bottom side and from the front to the back end. A front stabilizing fin parallel with the longitudinal axis includes an eyelet for connection to the end of a fishing line. A diagonal rear fin is set proximate the back end. The back end of the lure includes at least one eyelet for attachment to a tail leader. The body and fin design induce an infundibular rotational motion and whipping effect even at slow trolling speeds. Water distortion created by the lure motion produces sounds particularly attractive to predatory fish.

18 Claims, 3 Drawing Sheets

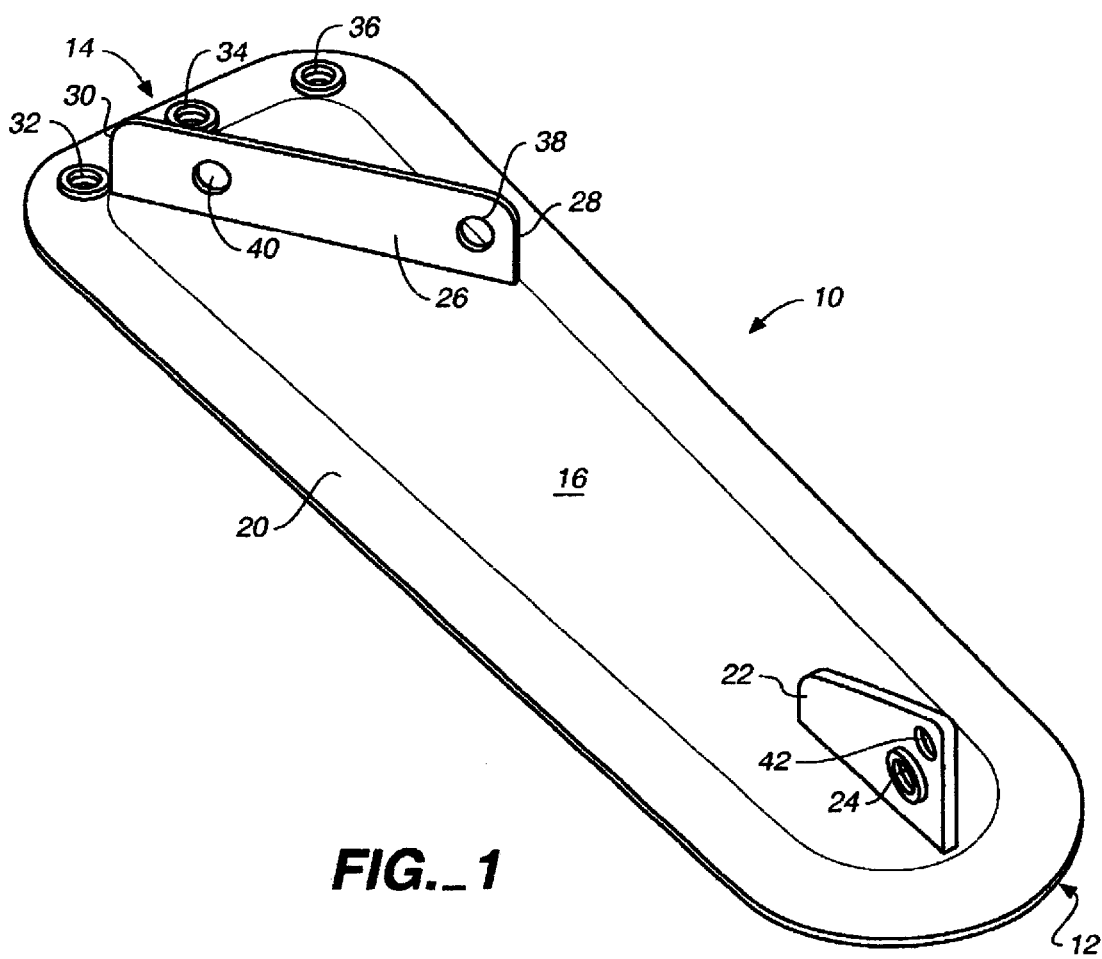
FIG._1

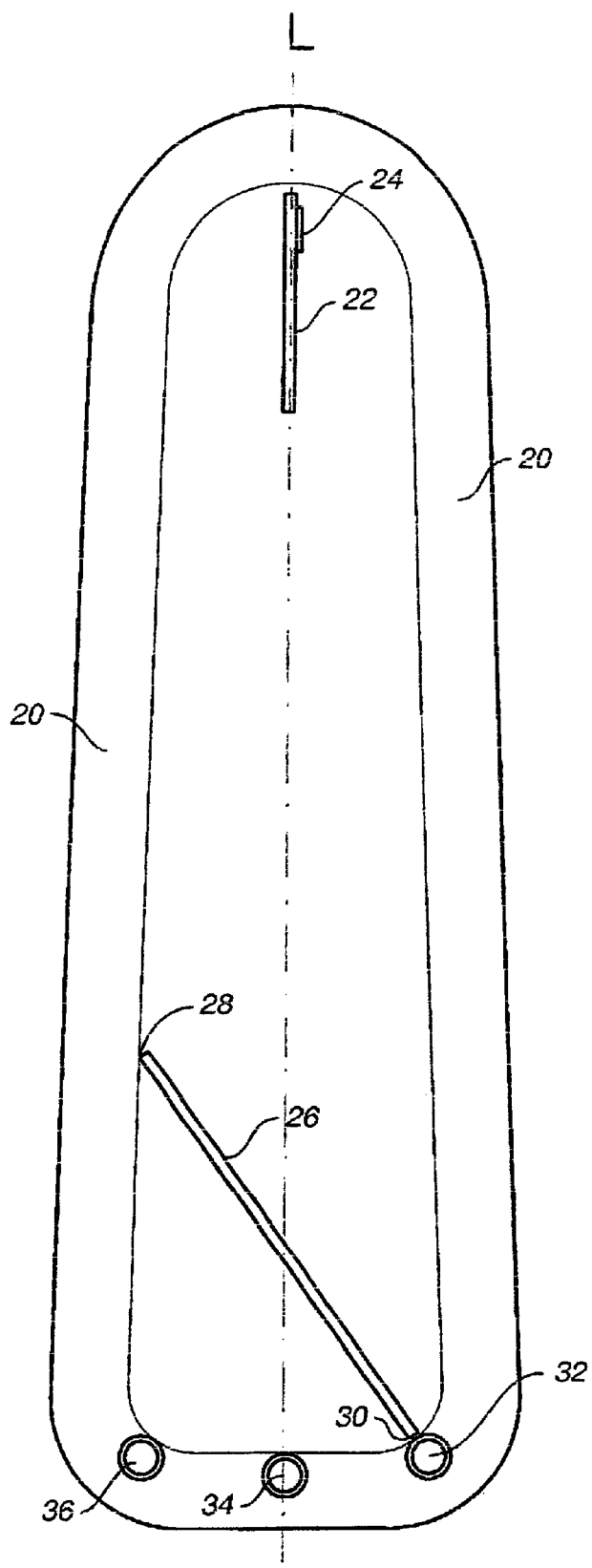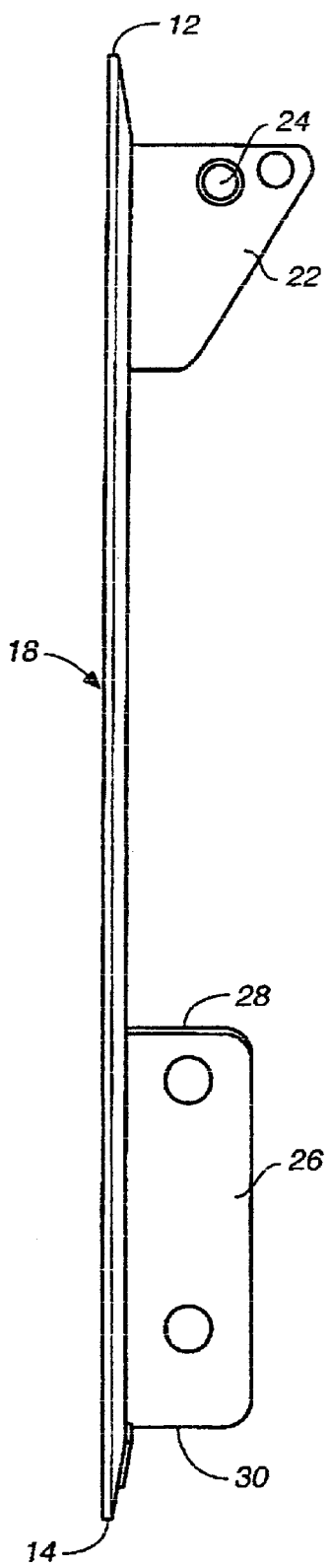
FIG._2   FIG._3

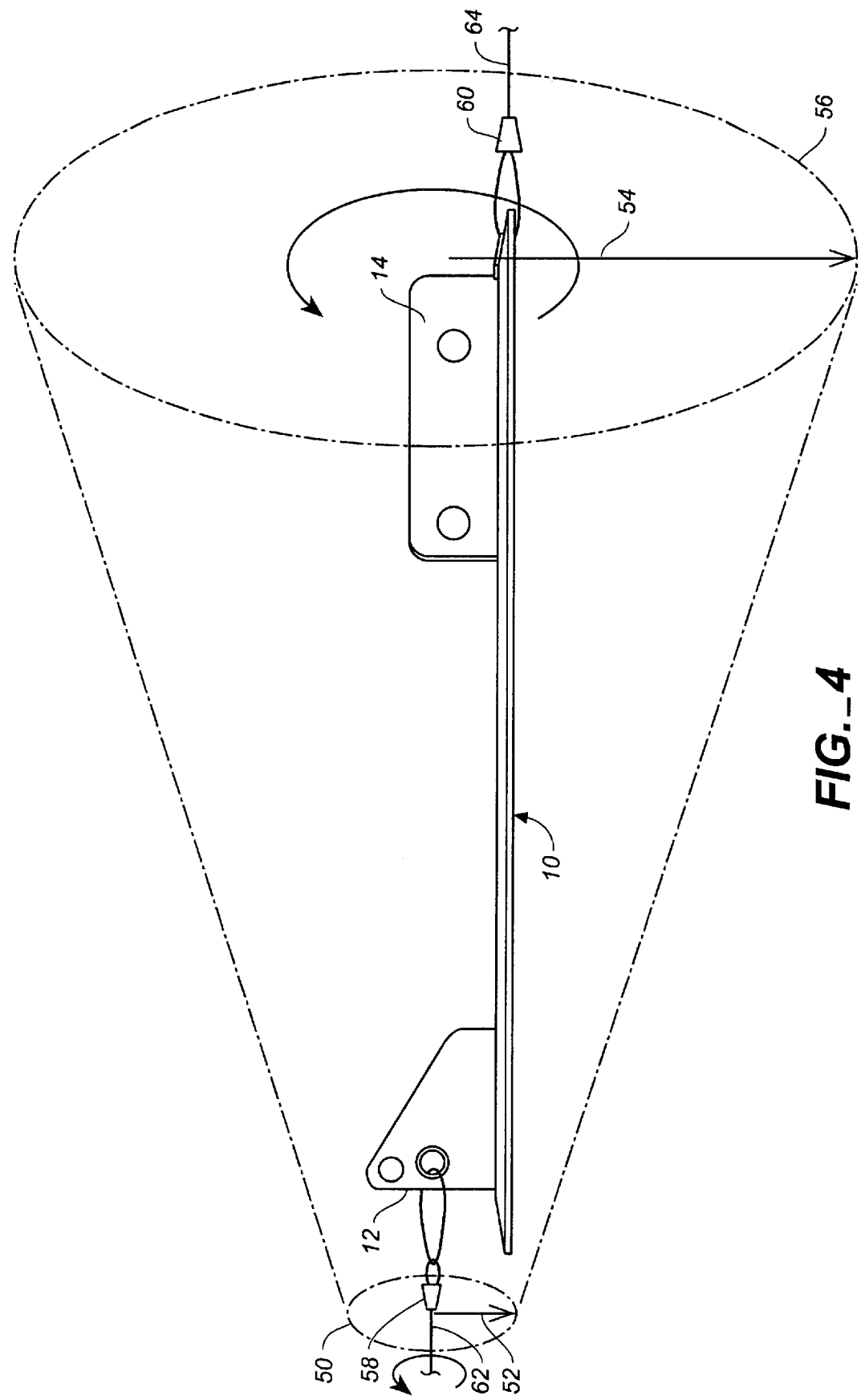
FIG._4

FISHING LURE AND TROLLING FLASHER

CROSS REFERENCE TO RELATED APPLICATIONS

This application claims the benefit of the filing date of U.S. Provisional Pat. Appl. No. 60/236,242, filed Sep. 28, 2000.

BACKGROUND OF THE INVENTION

1. Field of the Invention

The present invention relates generally to fishing lures, and more particularly to a new and improved fishing lure and trolling flasher that induces movements and visual effects to attract fish to a fishing line.

2. Discussion of Related Art

The field of fishing lures is crowded with countless creative solutions to the numerous problems anglers have encountered in the field. The general philosophy underlying lure design is to provide a device that closely mimics the most attractive prey for the sought-after predatory species of fish. To that end, lures have been designed to mimic both the movements and the appearance of bait fish. In some instances, successful lures, while not imitating food in the field, have mysteriously attracted fish for reasons that cannot be ascertained and evidently have nothing to do with technology imitating nature. One such lure is the spinning lure, of which there are countless iterations. Illustrative of the spinning lures is U.S. Pat. No. 6,108,961 to Milawski, et al, issued Aug. 29, 2000. This patent discloses a twisted, spinning fishing lure and counterweight that comprises a proximal end, a distal end, a counterbalance arm, and a rotatable helical body element having a lumen passing entirely through the body and a wire extending through the lumen. The wire includes a proximal portion having a eyelet for attaching to a fishing line and a counterbalance arm extending distally from the eyelet. Bearings reduce rotational forces from being transmitted from the rotatable helical body element to the wire extending through the body lumen. Any rotation forces transmitted to the wire are purportedly opposed by the counterbalance arm. The design provides for a pure spinning motion of the helical spinner body when dragged underwater.

U.S. Pat. No. 6,112,450 to Studanski, issued Sep. 5, 2000, discloses a zigzag aquatic device tethered by a single line that provides an accentuated zigzag or oscillating movement when the device has a relative speed with respect to water.

U.S. Pat. No. 6,115,957 to Bocach, issued Sep. 12, 2000, teaches a fishing lure including a body member having a wing member coupled to the body member with one of the ends of the wing member outwardly extending from one of the sides of the body member and the other end of the wing member outwardly extending from the other side of the body member. The second end of an elongate front flexible member is coupled to the front of the body member while the second end of an elongate rear member is detachably attached to the back of the body member.

U.S. Pat. No. 6,243,982 to Halterman, Jr. Jun. 12, 2001, discloses a spinner for spinning lures formed to resemble a small bait fish which rotates in moving air or water as a result of action against the broad surfaces of the tail fin plates and the internal broad surfaces of the spinner bodies.

Conspicuously missing from the prior art, including those patents cited above, are any fishing lures that induce an asymmetrical spinning motion having a differential range of rotation from one end of the lure to the other. The present inventor has compelling data that demonstrate the effectiveness of this fundamental design principle when the lure is used with appropriate and complementary line assemblies.

SUMMARY OF THE INVENTION

The fishing lure and trolling flasher of the present invention has a geometry that produces a differential radius of rotation in the front and back ends during trolling at any speeds. The lure comprises a front end, a back end, a top side, a bottom side, and a beveled edge bordering the entire lure that tapers downwardly from the top to the bottom side and from the front to the back end. A front stabilizing fin is substantially parallel with the longest dimension (longitudinal axis) of the lure and has an eyelet for connection to the end of a fishing line having a spinner. A rear fin is set diagonally at substantially a 35 degree angle from the longitudinal axis. The rear fin includes at least one eyelet that may be fastened to a tail leader. The fin design induces a infundibular rotational motion and whipping effect of the lure even at slow trolling speeds. Water distortion induced by the lure motion produces sounds particularly attractive to predatory fish.

Positioning multiple rear end eyelets offers the fisherman distinct actions or variations on the lure motion to give the lure versatility for use when fishing for multiple species of fish.

The lure is preferably fabricated from a hard plastic or polymeric material, more preferably from a transparent or semi-transparent material. A holographic tape may be applied to one or more of the top and bottom surfaces or positioned between layers of a laminated lure body.

BRIEF DESCRIPTION OF THE DRAWINGS

FIG. 1 is a perspective view of the fishing lure and trolling flasher of the present invention:

FIG. 2 is a top view of the lure and flasher of FIG. 1;

FIG. 3 is a side elevation view of the lure and flasher of FIGS. 1 and 2; and FIG. 4 shows the infridibular motion of the lure in use.

DETAILED DESCRIPTION OF THE PREFERRED EMBODIMENTS

According to the present invention there is disclosed a fishing lure and trolling flasher, the body of which is generally denominated 10, having a geometry adapted to produce a differential range of rotation in the front and back ends during trolling. The lure comprises a front or proximal end 12, a back, distal, or butt end 14, a substantially planar top side 16, a substantially planar bottom side 18, and a beveled edge 20 bordering the entire edge of the lure body and that tapers downwardly from the top to the bottom side and from the front to the back end. The lure further includes a front stabilizing fin 22, disposed substantially parallel to the longitudinal axis L of the lure body and having first and second eyelets 24, 42 for connection to the end of a fishing line having a spinner or swivel proximate the lure, and a rear fin 26 set diagonally at substantially a 35 degree angle from the longitudinal axis of the lure illustrated, though variations are desirable for differing sizes as is necessary to produce the desired rotational motions, as described below. The rear fin further spans the distance from its frontmost end 28 at the border of the beveled edge to its rearmost end 30 proximate a first rear end eyelet 32 of three rear end eyelets 32, 34, and 36, any of which may be fastened to a tail leader. Fin eyelets 38, 40, may be positioned in the rear fin to provide yet more alternatives for connection of the tail leader.

As may be readily appreciated from the drawings, the fin configuration induces a rotational motion of the lure even at slow trolling speeds. Furthermore, the tapered shape of the lure creates a kind of dynamic infundibular (funnelform, or conical) motion and whipping effect when the lure is used with a tail leader of less than 40 inches in length. This effect is most pronounced when the tail leader length is between 18 and 24 inches. Moreover, the water distortions induced by the lure motion produces sound effects that are particularly attractive to predatory fish. No other lure or flasher known in the art induces such effects at both slow and fast trolling speeds.

The three rear end eyelets offer the user three distinct actions or variations on the lure motion to give the lure versatility for use when fishing for multiple species of fish. The outside eyelet 36 has the fastest whipping motion, and the inside eyelet 32 has the slowest. The middle eyelet, accordingly, is a suitable medium. In every case, however, as shown in FIG. 4, the lure's motion is infundibular, or conical, wherein the front end 12 of the lure rotates in a circle 50 having a radius 52 which is roughly six times smaller than the radius 54 of the circle 56 described by the rotation of the back end 14. This provides a substantial "kick" on the bait even at slow trolling speeds.

As will be readily appreciated, the front end of the lure is connected to a fishing line 62, while the rear end is connected to a tail leader 64. The twisting and spinning induced by the lure creates a potential for line twisting, tangling and breaking. This is prevented through the use of a distal bearing assembly 58 and a proximal bearing assembly 60, each of which allow the lure to spin freely while keeping the line and the leader from any conflicting twisting.

The lure may be manufactured of any of a number of suitable materials, though a hard plastic or polymeric material is preferred. Even more preferably, the lure may be fabricated from a transparent or semi-transparent material and a highly reflective holographic tape applied to one or more of the surfaces, 16 and 18, of the lure or sandwiched between layers of a laminated lure body. This tape is adapted for use in both fresh and salt water and has been demonstrated to have a dramatic impact on the effectiveness of the lure. When the lure body is fabricated from transparent or semitransparent material, the beveled edge itself produces a prism-like effect from sunlight, but this effect is accentuated by the holographic tape. The sparkling effect and the arrays of colors that emanate from the lure simulates the effect of light reflecting off many species of fish, and therefore the instant invention justly earns its proprietary name of FISH-CATCHER™ (which is a trademark of Bechhold & Son, Flasher & Lure, Co., of Petaluma, Calif.).

Thus, in another aspect, and in the most general terms, the present invention may be characterized as a trolling flasher, comprising an elongate lure body tapering outwardly from a proximal end to a distal end, a substantially planar top side, a substantially planar bottom side, and a beveled edge; a front stabilizing fin disposed substantially parallel to the longest dimension of the elongate flasher body; a rear fin disposed diagonally relative to the longest dimension of the elongate flasher body; means for connecting the proximal end of the flasher to a fishing line; means for connecting the distal end to a tail leader; and reflective material for reflecting light from at least one of either the top or bottom sides.

The preferred means for connecting the proximal end of the flasher to a fishing line comprises at least one eyelet disposed in the front fin. and the preferred means for connecting the distal end of the flasher to a tail leader comprises at least one eyelet disposed in the distal end of the flasher body. More preferably, the flasher has three eyelets at the distal end, and, as noted above, the flasher body has a beveled edge and is manufactured of transparent plastic.

What is claimed as invention is:

1. A fishing lure for use in trolling, comprising:
    a body having a front end, a back end, a substantially planar top side, a substantially planar bottom side, and a longitudinal axis, said body tapering outwardly from said front end to said back end, and at least one eyelet at said back end for connection to a tail leader;
    a front stabilizing fin disposed on said bottom side and having at least one eyelet for connection to the end of a fishing line; and
    a diagonal rear fin disposed on said bottom side having a front end and a rear end;
    whereby the fin configuration induces a rotational motion and the tapered shape of said lure body produces a dynamic asymmetrical conical motion from said front end to said back end while trolling.

2. The fishing lure of claim 1, wherein said lure body has a beveled edge that tapers downwardly from said top to said bottom side and from said front to said back end.

3. The fishing lure of claim 1, wherein said front fin is disposed substantially parallel to said longitudinal axis of said lure body.

4. The fishing lure of claim 1, wherein said rear fin is set diagonally at substantially a 35 degree angle from the longitudinal axis of said lure body.

5. The fishing lure of claim 1, wherein said lure body includes at least two rear eyelets.

6. The fishing lure of claim 1, wherein said lure body includes at least three rear eyelets.

7. The fishing lure of claim 1, wherein said rear fin includes at least one eyelet for connection of a tail leader.

8. The fishing lure of claim 1, wherein said lure is fabricated of hard plastic.

9. The fishing lure of claim 1, wherein said lure body is fabricated from a transparent plastic.

10. The fishing lure of claim 1, further including holographic tape applied to at least said top and said bottom sides.

11. The fishing lure of claim 1, wherein said lure body is fabricated of laminated transparent plastic, and further including a reflective holographic material interposed between any two layers of said lure body.

12. The fishing lure of claim 1, wherein said beveled edge produces a prism-like effect when illuminated with sunlight.

13. The fishing lure of claim 1, wherein said lure is used in combination with a fishing line and a tail leader, said fishing line connected to said lure at said eyelet of said front fin, said tail leader connected to one of said at least one eyelets at said rear end of said lure body, and further including a proximal bearing assembly connected to said fishing line and a distal bearing assembly connected to said tail leader, said bearing assemblies permitting said lure to spin while preventing said fishing line and said leader from twisting.

14. A trolling flasher, comprising:
    an elongate lure body tapering outwardly from a proximal end to a distal end, a substantially planar top side, a substantially planar bottom side, a longitudinal axis, and a beveled edge;
    a front stabilizing fin integral with said bottom side and disposed substantially parallel to said longitudinal axis of said elongate lure body;

a rear fin integral with said bottom side and disposed diagonally relative to the longest dimension of said elongate lure body;

means for connecting said proximal end of said flasher to a fishing line;

means for connecting said distal end of said flasher to a tail leader;

reflective material for reflecting light from at least one of said top side and said bottom side;

whereby during trolling said lure rotates around said longitudinal axis in an asymmetrical conical motion from said front end to said back end.

15. The trolling flasher of claim 14, wherein said means for connecting said proximal end of said flasher to a fishing line comprises at least one eyelet disposed in said front fin, and wherein said means for connecting said distal end of said flasher to a tail leader comprises at least one eyelet disposed in said distal end of said flasher body.

16. The trolling lure of claim 13, wherein said flasher body has three eyelets disposed at said distal end.

17. The trolling lure of claim 14, wherein said flasher body has a beveled edge.

18. The trolling lure of claim 14, wherein said flasher body is manufactured of transparent plastic, and wherein said reflective material is holographic tape.

* * * * *